United States Patent Office 2,787,481
Patented Apr. 2, 1957

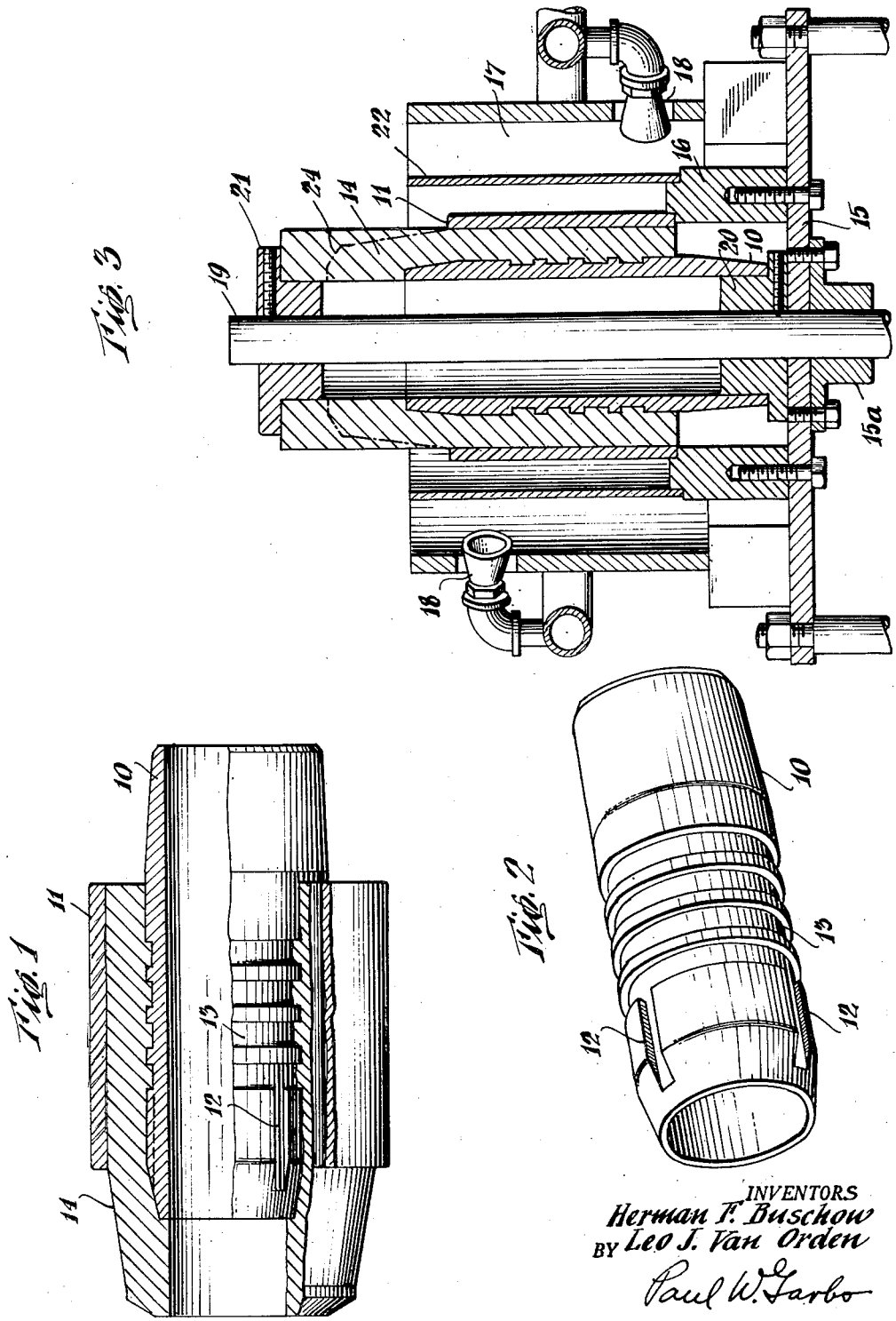

2,787,481

TRANSITION PIPE COUPLING

Herman F. Buschow, Hillsdale, and Leo J. Van Orden, Glen Ridge, N. J., assignors to Hydrocarbon Research, Inc., New York, N. Y., a corporation of New Jersey Application August 20, 1952, Serial No. 305,382

3 Claims. (Cl. 285—329)

The present invention relates to a transition pipe coupling. More particularly, the invention relates to a coupling to which two pipes of dissimilar metals may be welded or brazed, thereby joining the dissimilar metal pipes in a continuous, leak-proof conduit.

It is widely recognized that no one metal is of universal applicability. Pipes are fabricated of various steels, copper, aluminum, brass, magnesium, etc. For some purposes, one metal has qualities which makes its use desirable or even imperative, but at the same time a pipe made of another metal is desirable in another place. The problem to which this invention is directed arises when two dissimilar metal pipes must be joined to form a unitary, gas-tight conduit. Ordinarily, welding and brazing are desirable methods of joining pipes but there are many metals, such as aluminum and stainless steel, which cannot satisfactorily be welded together.

It is an object of this invention to provide a transition coupling which makes it possible to weld or braze pipes of dissimilar metals into a continuous, leak-proof conduit. Additional objects and advantages of the invention will be apparent in the description which follows.

For brevity and clarity of expression, hereinafter, the term, nipple, will be used to connote a relatively short piece of pipe. In this manner, the nipples which form the coupling of this invention will not be confused with the pipes which are connected to one another through the coupling. Also, references to dissimilar metals are intended to mean metals which cannot satisfactorily be joined by fusion, e. g., by welding or brazing. Conversely, similar metals are, for the purposes of this invention, those which can be joined by fusion even though the metals so joined differ in composition.

The transition pipe coupling of this invention which permits the connection of one metal pipe to a pipe of a dissimilar metal by fusion, i. e., welding and/or brazing, comprises two nipples of different metals in tightly telescoped relation, one nipple providing the portion of the coupling which can be joined by fusion to a pipe of a metal similar to the metal of that nipple and the other nipple providing the portion of the coupling which can be joined by fusion to another pipe of a metal dissimilar to the metal of the first-mentioned pipe but similar to the metal of the second-mentioned nipple.

The opposed surfaces of the two telescoped nipples must be in pressing contact throughout the entire area of overlap for a good leak-proof joint. A very satisfactory way of attaining this pressing contact is to forge or swage one of the two nipples that are in tightly telescoped relation. At least the nipple which is to be deformed must be of a metal sufficiently ductile to undergo the forging or swaging operation without failure. Preferably, the metal of the deformed nipple has a lower strength than that of the metal of the other nipple. While one nipple is being deformed, the other nipple may be supported to prevent its deformation. For clarity, the non-deformed nipple will hereinafter be termed the base nipple.

The good contact achieved by the forging or swaging operation is, of itself, not adequately preventive of leakage. Gas under pressure, say 100 lbs. per sq. in. and higher, may seep through between the contacting surfaces of the two telescoped nipples. Stresses, such as pulling, bending and twisting, imposed on the coupling by the pipes which are connected through the coupling also tend to break the seal. It is therefore within the contemplation of this invention to impose initially on the coupling a self-contained contact pressure which counteracts or renders ineffective such stresses and thus prevents leakage under all conditions.

One mode of imposing the self-contained contact pressure on the telescoped surfaces of the coupling is to place a stressed sleeve externally of the coupling. For example, the sleeve may comprise two tightly bolted, semi-cylindrical halves surrounding the outer nipple. Alternatively, a metal sleeve having an internal diameter at room temperature slightly smaller than the external diameter of the outer nipple of the coupling, is heated to expand the sleeve which is then slipped over the outer nipple and quenched. Thus, the metal sleeve which has been placed around the outer nipple with a shrink-fit keeps the outer nipple under a compression that imposes the desired contact pressure between the opposed surfaces of the two telescoped nipples of the leak-proof coupling.

In fabricating a transition coupling according to this invention, due regard must be had for the physical conditions of its intended use. For example, if tensile stresses are expected, it is advisable to have circumferential grooves in the surface of the base nipple so that the metal of the other nipple will flow into and key with the grooves when the latter nipple is swaged or forged. For torsional stresses, longitudinal grooves are effective. When a sleeve is used, the deformed nipple is sandwiched between the base nipple and the sleeve. In such case, the base nipple and the sleeve are advantageously made of the same metal.

For maximum insurance against leakage, circumferential grooves in the base nipple with the deformed metal of the other nipple keyed into these grooves should be used, particularly in couplings wherein the sleeve is omitted.

In the accompanying drawings forming a part of the specification and showing for exemplification a preferred form of this invention:

Figure 1 is a partial longitudinal section of the coupling;

Figure 2 is an isometric view of the base nipple of the coupling of Figure 1; and Figure 3 is a vertical section through a precision jig for shrink-fitting an outer sleeve onto the coupling.

A stainless steel base nipple 10 having a tool finish on the outside surface is provided with longitudinal grooves or slots 12 and circumferential slots 13 on the outer surface. An aluminum nipple 14 initially has smooth inner and outer surfaces, and an inner diameter large enough for nipple 14 to slip over base nipple 10 at room temperature. Aluminum nipple 14 is then swaged onto base nipple 10 in a conventional swaging die. The pressure applied by the die exceeds the yield point of the aluminum and causes it to cold flow into slots 12 and 13 of base nipple 10 and into complete contact throughout the telescoped surfaces of the two nipples. The nipples are only partially telescoped so that aluminum nipple 14 projects out at one end of the coupling and the steel nipple 10 out at the other end.

After swaging, the outer surface of aluminum nipple 14 is machined down to a predetermined diameter just larger by a desired amount than the inner diameter of a stainless steel sleeve 11. Figure 3 shows a positioning jig used to shrink-fit sleeve 11 onto the swaged coupling. A base plate 15 holds a sleeve-centering block 16. Mounted on base plate 15 is a cylindrical muffle furnace 17 which is heated by a plurality of burners 18. A central rod 19 with guide plugs 20 and 21 slides into a centering hole in plate 15 and is used to center the coupling. Sleeve 11 is placed on block 16 and is there heated by furnace 17 to a temperature of about 600° F. A cylindrical shield 22 protects sleeve 11 from direct flame impingement from burners 18. The swaged coupling is chilled to about −50° F. by Dry Ice and at this temperature with the aid of rod 19 and guide plugs 20 and 21 is slipped into heated sleeve 11. The shrinkage of the chilled coupling and the expansion of the heated sleeve 11 provide sufficient clearance for dropping the coupling into sleeve 11. By contact with water, the assembly is then quickly brought to an intermediate temperature, i. e., room temperature. The resulting contraction of sleeve 11 and expansion of the coupling force the elements of the assembly into tight engagement with the desired contact pressure at the opposed surfaces of the telescoped nipples. It is to be noted that while desirable contraction of the swaged coupling occurs upon chilling to −50° F., the chilling step is also important in hardening the aluminum surface and thus helping to prevent its yielding at the first point of contact when heated sleeve 11 cools into engagement therewith. Bearing 15a ensures the sliding of rod 19 in alignment with sleeve 11.

As indicated in Figure 3, nipple 14 may initially be longer than needed, the extra length providing an end portion by which the telescoped nipples may be gripped during the manufacture of the coupling. When the assembly of the coupling has been completed, the extra length of nipple 14 is trimmed off along the dotted line 24 (Figure 3) to give the finished shape of nipple 14 shown in Figure 1. The completed transition coupling is ready for connecting a stainless steel pipe to an aluminum pipe simply by welding steel nipple 10 of the coupling to the steel pipe and aluminum nipple 14 to the aluminum pipe.

As a specific example of the transition coupling illustrated by Figure 1, the stainless steel base nipple 10 is ⅜-inch thick and has an outside diameter of 4 inches. Aluminum nipple 14 has an outside diameter of 5 inches and an inside diameter that permits an easy sliding fit over steel nipple 10 when the aluminum nipple 14 is heated to a temperature of 250 to 300° F.; after the heated aluminum nipple 14 has been slipped over steel nipple 10 and allowed to cool, the two nipples are in firm contact with one another. Steel nipple 10 has three circumferential grooves 13 and four longitudinal grooves 12, each ⅝₁₆-inch wide and 0.03-inch deep. The telescoped nipples are die pressed, a suitable mandrel being slipped into steel nipple 10 to prevent its collapse or deformation while the aluminum nipple 14 is being forced into tight contact with steel nipple 10. During this swaging operation, the aluminum of nipple 14 flows into all of the grooves 12 and 13 on steel nipple 10. The mandrel also serves as a centering device for machining the aluminum surface of the swaged coupling to an outside diameter of 4¾ inches. Stainless steel sleeve 11 is ⅜-inch thick and has an internal diameter which at room temperature (75° F.) is from 0.007 to 0.009 inch less than the outside machined diameter of the aluminum nipple 14 of the swaged coupling. Sleeve 11 is heated and the swaged coupling is chilled, and with the aid of the jig of Figure 3 the swaged coupling is inserted in sleeve 11. When the assembly is cooled to room temperature, sleeve 11 exerts a pressure on the aluminum surface of approximately 3,000 pounds per square inch. Since this coupling is to be used in a plant for producing oxygen by the liquefaction and rectification of air wherein temperatures as low as about −300° F. are encountered, the coupling was repeatedly cooled to −300° F. and warmed to 100° F. and then tested for gas leaks. The coupling remained gas tight.

In another specific example, the stainless steel nipple 10 is 1¼-inch thick and has an outside diameter of 18 inches. Grooves 12 and 13 are each ⅝-inch wide and 0.125-inch deep. Aluminum nipple 14 has an outside diameter of 20¼ inches and an inside diameter that permits an easy sliding fit over steel nipple 10 when heated to 250 to 300° F. As in the preceding example, the telescoped nipples are die pressed together to establish a high contact pressure between the telescoped surfaces of the nipples and the aluminum surface of the pressed coupling is then machined down to an outside diameter of 19¾ inches. Stainless steel sleeve 11 is 1-inch thick and has an inside diameter which at room temperature is about 0.026-inch less than the outside machined diameter of the aluminum nipple 14. As in the preceding example, sleeve 11 is shrink-fitted over the swaged coupling and exerts a pressure of about 3,000 pounds per square inch on the aluminum nipple 14. This coupling is also designed for use in an oxygen plant and withstands repeated testing for gas-tightness.

In view of the various modifiactions of the invention which will occur to those skilled in the art upon consideration of the foregoing disclosure without departing from the spirit or scope thereof, only such limitations should be imposed as are indicated by the appended claims.

What is claimed is:

1. A short transition pipe coupling comprising a tightly telescoped pair of cylindrical unthreaded nipples, the outer nipple and the inner nipple of said telescoped pair being formed, respectively, of aluminum and steel, the wall thickness of said outer nipple being greater than that of said inner nipple, said inner nipple having a plurality of axially spaced, circumferential grooves in its outer cylindrical surface, said outer nipple having deformed portions extending into and filling said circumferential grooves, said nipples extending axially beyond the telescoped portions thereof in opposite directions to form connecting portions adapted to be welded to pipes of respectively similar metals, and said pipe coupling having a substantially smooth cylindrical inner surface.

2. The coupling of claim 1 wherein the inner nipple has a plurality of radially spaced, longitudinal grooves in its outer cylindrical surface.

3. The coupling of claim 1 wherein the outer nipple is under compression between the inner nipple and a sleeve member.

References Cited in the file of this patent

UNITED STATES PATENTS

| | | |
|---|---|---|
| 351,263 | Hemphill | Oct. 19, 1886 |
| 1,329,479 | Savon | Feb. 3, 1920 |
| 1,678,640 | Hall | July 31, 1928 |
| 1,678,343 | Madden | Oct. 9, 1928 |
| 1,693,838 | Faudi | Dec. 4, 1928 |
| 1,703,037 | Heck | Feb. 19, 1929 |
| 1,736,610 | Loffler | Nov. 19, 1929 |
| 1,776,615 | Boothman et al. | Sept. 23, 1930 |
| 2,209,181 | Wendel | July 23, 1940 |
| 2,230,115 | Kreidel | Jan. 28, 1941 |
| 2,375,574 | Metheny | May 8, 1945 |

FOREIGN PATENTS

| | | |
|---|---|---|
| 585,377 | Germany | Oct. 6, 1933 |
| 816,069 | France | Apr. 19, 1937 |